(12) United States Patent
Vivanco et al.

(10) Patent No.: US 12,058,628 B2
(45) Date of Patent: Aug. 6, 2024

(54) FINE TUNING SYNCHRONIZATION SIGNALS POWER BOOSTING OVER 5G NETWORK

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Mikolaj Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 324 days.

(21) Appl. No.: 17/550,468

(22) Filed: Dec. 14, 2021

(65) Prior Publication Data
US 2023/0189169 A1    Jun. 15, 2023

(51) Int. Cl.
*H04W 52/38*   (2009.01)
*H04W 24/08*   (2009.01)
*H04W 56/00*   (2009.01)

(52) U.S. Cl.
CPC ........... *H04W 52/38* (2013.01); *H04W 24/08* (2013.01); *H04W 56/001* (2013.01)

(58) Field of Classification Search
None
See application file for complete search history.

(56) References Cited

U.S. PATENT DOCUMENTS

| | | | | |
|---|---|---|---|---|
| 9,277,509 | B1 * | 3/2016 | Sitaram | H04W 52/283 |
| 2015/0334607 | A1 * | 11/2015 | Singh | H04W 36/0079 |
| | | | | 455/437 |
| 2018/0324712 | A1 * | 11/2018 | Wang | H04W 52/244 |
| 2019/0327784 | A1 * | 10/2019 | Tarimala | H04W 76/27 |
| 2023/0029173 | A1 * | 1/2023 | Abedini | H04L 5/14 |

OTHER PUBLICATIONS

"5G NR Cell Search and System Acquisition Procedure," https://www.techplayon.com/5g-nr-cell-search-and-synchronization-acquiring-system-information/, Jul. 28, 2019, 5 pages.

* cited by examiner

*Primary Examiner* — Saad Khawar
(74) *Attorney, Agent, or Firm* — Guntin & Gust, PLC; John G. Rauch

(57) ABSTRACT

Aspects of the subject disclosure may include, for example, collecting performance information for a plurality of user equipment (UE) devices and a base station in a radio communication network, determining that one or more UE devices experience a synchronization failure attempting to connect to a base station, determining to temporarily boost transmit power of a synchronization signal block by the base station to facilitate synchronization, determining a boosted power level of the transmit power of the synchronization signal block to minimize disruption to UE devices in an overlapping area between a first cell coverage area of the base station and a second cell coverage area of an adjacent base station, transmitting the synchronization signal block by the base station at the boosted power level for reception by the UE devices, and connecting one or more UE devices to the base station. Other embodiments are disclosed.

20 Claims, 9 Drawing Sheets

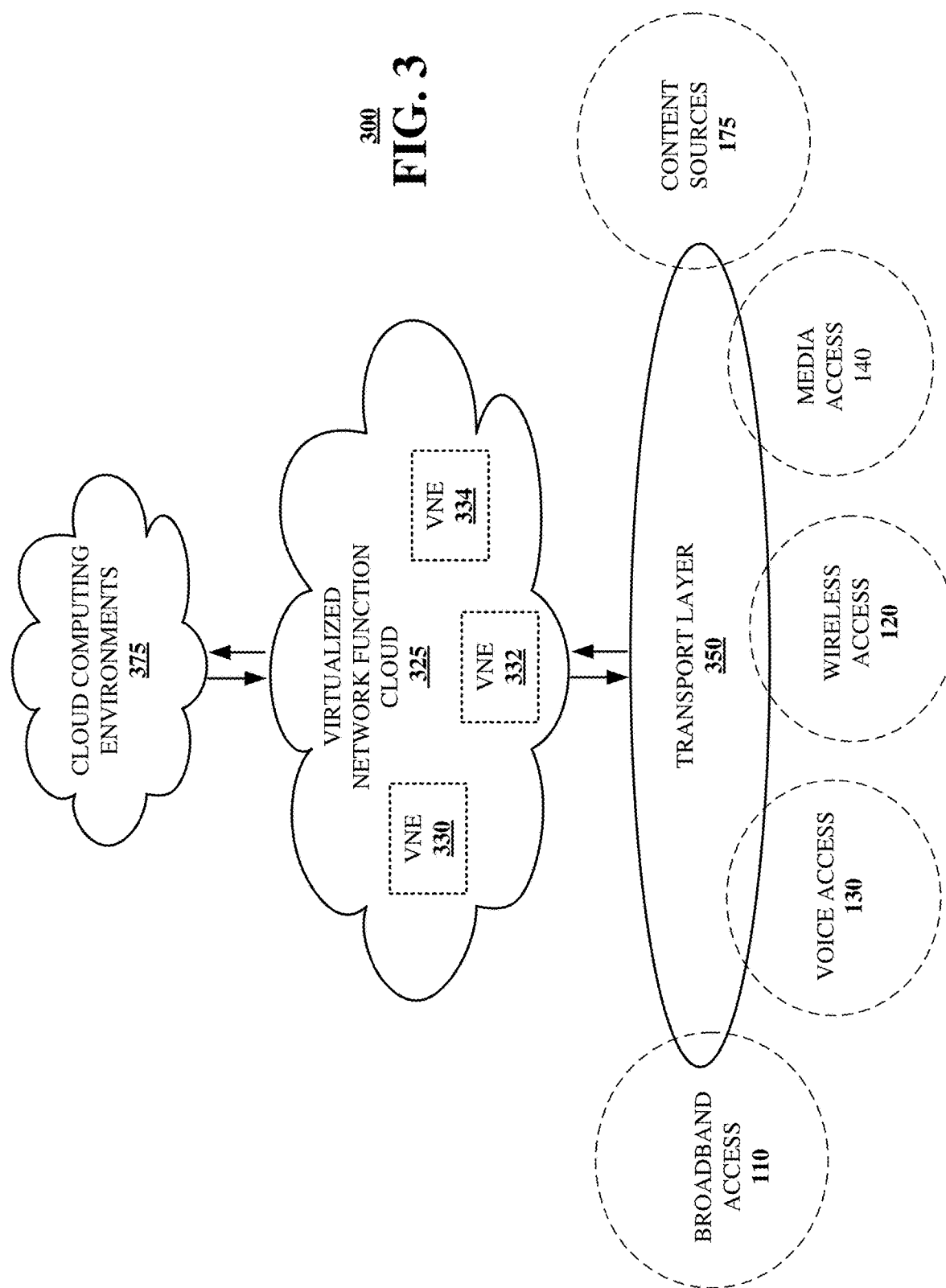

FINE TUNING SYNCHRONIZATION SIGNALS POWER BOOSTING OVER 5G NETWORK

FIELD OF THE DISCLOSURE

The subject disclosure relates to system and method for fine tuning of synchronization signals by selective power boosting in a radio communications network.

BACKGROUND

In some radio communication systems, a synchronization signal block is communicated from a base station to a mobile station or user equipment (UE) seeking to join the network or hand over from one base station to another. When the mobile station is at the edge of a coverage area of the base station, the mobile station may have difficulty receiving the synchronization signal block.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
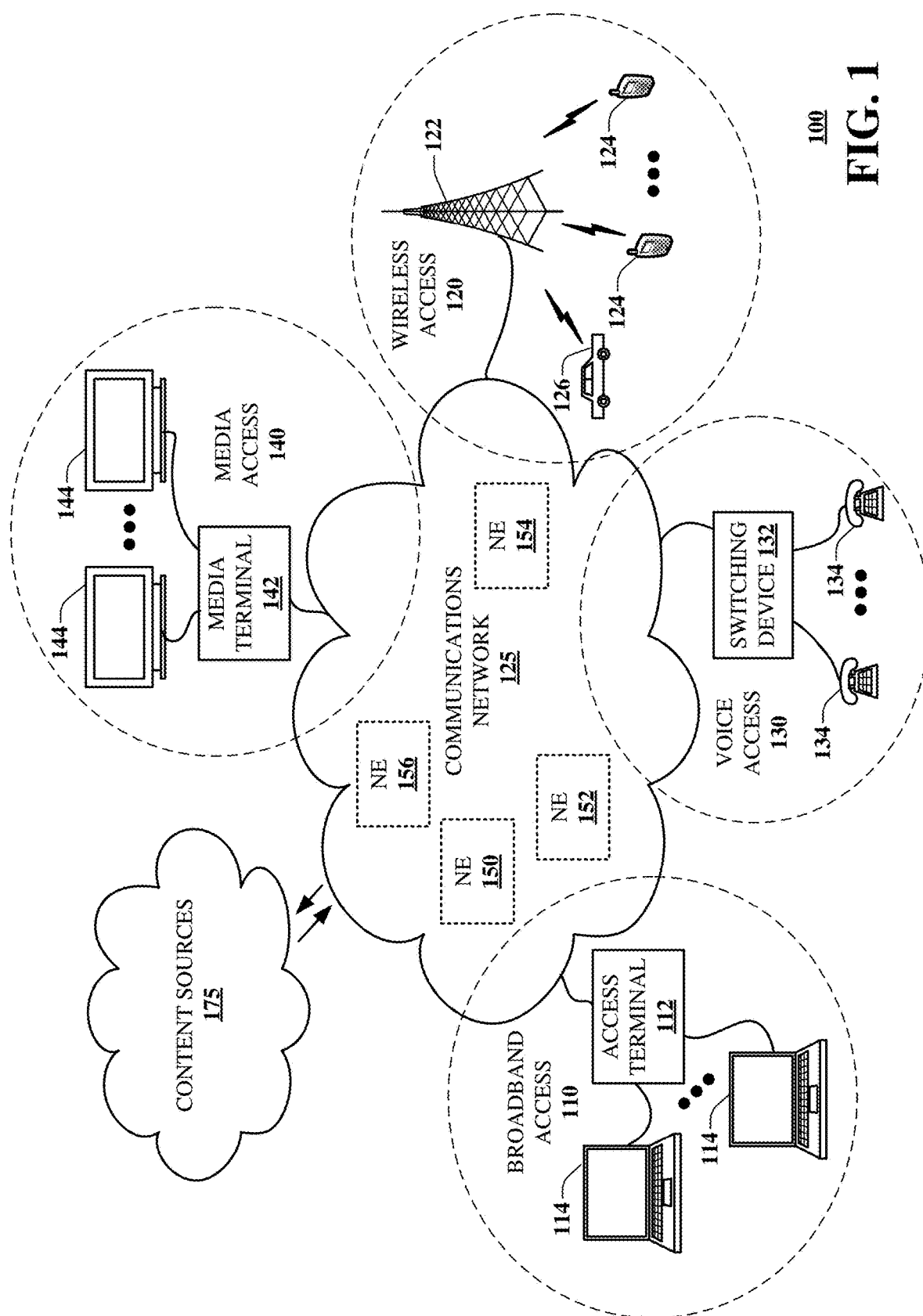
FIG. 1 is a block diagram illustrating an exemplary, non-limiting embodiment of a communications network in accordance with various aspects described herein.

The subject disclosure describes, among other things, illustrative embodiments for identifying individual user equipment (UE) devices experiencing synchronization failure in a radio network and assisting synchronization by the UE devices with a base station. Information about synchronization failures, such as handover failures and radio connection failures for devices throughout the network is collected. For UE devices located at a cell edge where a synchronization signal may be lost in interference, a heuristic model may determine to temporarily boost the transmit power for the synchronization signal block transmitted by the base station for the UE devices at the cell edge. The effect on other UE devices in the cell edge area, which may be attached to adjacent cells, is considered by the heuristic model. The heuristic model will weigh the benefits of boosting transmit power of the synchronization signal against the impact on other UE devices in the cell edge area that do not experience synchronization failure. Other embodiments are described in the subject disclosure.

One or more aspects of the subject disclosure include collecting performance information for a plurality of user equipment (UE) devices and at least one base station in a radio communication network, wherein the performance information includes at least connection failure information and handover failure information for the plurality of UE devices and the at least one base station, determining, based on the performance information, that one or more UE devices of the plurality of UE devices experience a synchronization failure attempting to connect to one base station of the at least one base station, determining a first number of UE devices experiencing the synchronization failure, and determining a second number of UE devices in an overlapping area of cell coverage of the one base station. Aspects of the disclosure further include, based on the first number of UE devices and the second number of UE devices, determining to temporarily boost a transmit power of a synchronization signal block by the one base station to facilitate synchronization between the one base station and the first number of UE devices experiencing the synchronization failure, based on at least the second number of UE devices, determining a boosted power level of the transmit power of the synchronization signal block by the one base station to minimize disruption to the second number of UE devices in the overlapping area of cell coverage of the one base station, initiating transmission of the synchronization signal block by the one base station at the boosted power level, and connecting one or more of the first number of UE devices to the one base station, wherein the connecting comprises obtaining time synchronization and frequency synchronization on a radio link between the one or more of the first number of UE devices and the one base station.

One or more aspects of the subject disclosure include collecting performance information for a plurality of user equipment (UE) devices and at least one base station in a radio communication network, determining, based on the performance information, that one or more UE devices of the plurality of UE devices experience a synchronization failure attempting to connect to a base station of the at least one base station, and determining to temporarily boost transmit power of a synchronization signal block by the base station to facilitate synchronization between the base station and the UE devices experiencing the synchronization failure. Aspects of the subject disclosure further include determining a boosted power level of the transmit power of the synchronization signal block to minimize disruption to UE devices in an overlapping area between a first cell coverage area of the base station and a second cell coverage area of an adjacent base station, initiating transmission of the synchronization signal block by the base station at the boosted power level for reception by the UE devices experiencing the synchronization failure, and connecting one or more UE devices to the base station.

One or more aspects of the subject disclosure include collecting performance information for a plurality of user equipment (UE) devices and at least one base station in a radio communication network, wherein the performance information includes at least connection failure information and handover failure information for the plurality of UE devices and the at least one base station, storing the performance information at a node of a core network, wherein the core network is in data communication with the radio communication network and processing the performance information at the node of a core network. Aspects of the disclosure further include determining based on the performance information, that one or more UE devices of the plurality of UE devices experience a synchronization failure attempting to connect to a base station of the at least one base station, determining to temporarily boost a transmit power of a synchronization signal block by the base station to facilitate synchronization between the base station and the UE devices experiencing the synchronization failure, determining based on the performance information, a number of UE devices of the one or more UE devices are located in an area of a cell edge of a coverage area of the base station, and determining a boosted power level of the transmit power of the synchronization signal block by the base station, wherein the determining a boosted power level is responsive to a determination that the number of UE devices of the one or more UE devices located in the area of a cell edge exceeds a threshold. Aspects of the disclosure further include initiating transmission of the synchronization signal block by the base station at the boosted power level for reception by the UE devices experiencing the synchronization failure and connecting one or more of the UE devices to the base station.

Referring now to FIG. 1, a block diagram is shown illustrating an example, non-limiting embodiment of a system 100 in accordance with various aspects described herein. For example, system 100 can facilitate in whole or in part identifying user equipment devices experiencing synchronization failure with a base station in a radio network and enabling temporary, localized boosting of synchronization signals by the base station to facilitate synchronization by the user equipment devices without disrupting other user equipment devices in the coverage area of the base station. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
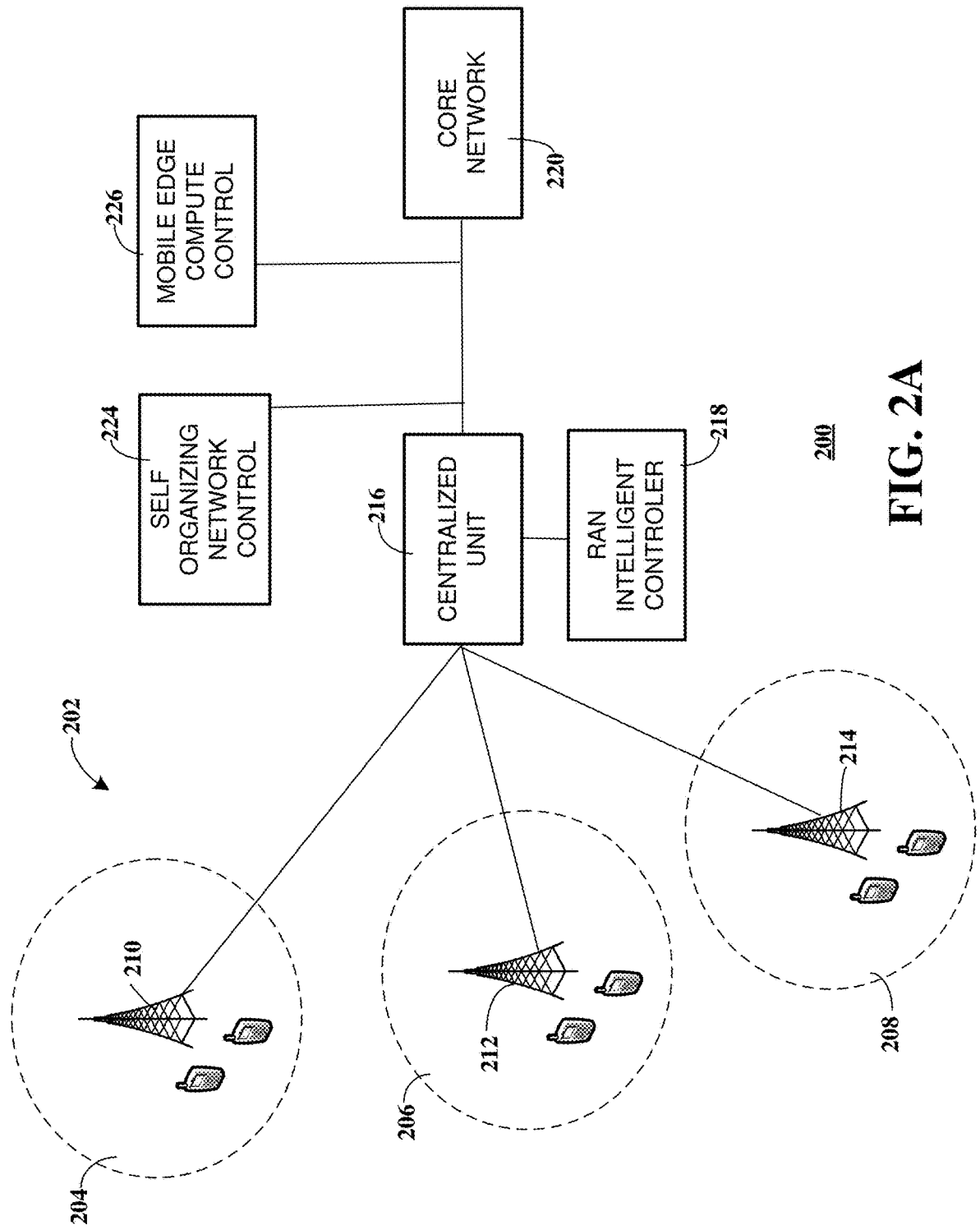
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a radio communication network 200 functioning within the communication network 125 of FIG. 1 in accordance with various aspects described herein. The radio communication network 200 is an exemplary embodiment of a network for radio communication among fixed parts such as base stations or access points and portable parts such as mobile devices.

Embodiments may have particular application in a radio communication system such as a cellular communication system. Such a system generally includes a plurality of cells in which each respective cell provides telecommunication service to a respective geographic area. In FIG. 1, wireless access 120 is an example of providing radio communication to a plurality of user equipment (UE) or mobile devices 124 and vehicle 126 via base station or wireless point 122, The base station or wireless access point 122 provides telecommunication service to compatible equipment in the geographic area served by the base station or wireless access point 122. A cellular communication system may include a plurality of contiguous cells, each cell including a base station or wireless access point 122 serving an assigned area. The base station or wireless access point 122 provides radio communication services to UE such as mobile phones other devices in a cell. Such a cellular communication system may be referred to as a mobile communication system. As a mobile phone or other UE device moves from a first cell to an adjacent cell, radio communication with a particular base station or wireless access point 122 is handed off to a subsequent base station or access point serving the adjacent cell in a process known as handoff or handover.

The radio communication system may be a radio access network (RAN) which provides radio communication services to user equipment (UE) devices within a geographic area. The RAN may include a plurality of access points or base stations. The access points or base stations may be referred to as a Node B or evolved Node B or eNodeB or gNB or other names.

In fifth generation (5G) cellular systems in particular, a base station may be referred to as a gNB. The gNB provides NR user plane and control plane terminations towards UE devices. The gNB connects with a core network. In some embodiments, the gNB includes three modules or components. A control unit (CU) handles mobility control (MC), radio resource management (RRM) and session management (SM). A distributed unit (DU) provides physical layer (PHY) and medium access control layer (MAC) functionalities for the gNB. A radio unit (RU) provides radio communications with UE devices in the cell served by the gNB.

The gNB of the RAN may be in communication with a core network (CN) for connection to other communication services and for managing tasks such as UE registration and handoff. Each RAN operates according to a radio access technology. Examples of such radio access technologies include fifth generation cellular (5G), fourth generation cellular (4G), Long-term Evolution (LTE) or third generation cellular (3G), Universal Mobile Telecommunication System (UMTS), Evolved Universal Mobile Telecommunications System Terrestrial Radio Access Network (E-UTRAN) and others as well. Other examples of such radio access technologies include technologies and protocols to be developed in the future. The UE operates according to complementary radio access technology. The UE may be referred to as a mobile station (MS), portable part (PP) or new radio (NR), for example.

The radio communication network 200 in the exemplary embodiment of FIG. 2A includes three cells including a first cell 204, a second cell 206 and a third cell 208, a centralized unit (CU) 216, a radio access network (RAN) intelligent controller (RIC) 218, and a core network 220. The first cell 204 is served by a first base station or gNB 210. The second cell 206 is served by a base station or gNB 212. The third cell 208 is served by a third base station or gNB 214. The CU 216 is in data communication with the core network 220. The three cells including the first cell 204, the second cell 206 and the third cell 208 together form a cluster 202. Each respective cell may be termed a network node. Each network node provides radio access to remaining portions of the network such as the core network 220.

The core network 220 forms a connection or gateway to other networks such as the public internet. Further, the core network 220 may include one or more nodes that perform required functions for the radio communication network 200. Exemplary functions include mobility management, billing and account management and other supervisory functions. In exemplary embodiments, one or more nodes of the core network 220 may collect and store radio resource control (RRC) information for devices operating in the radio communication network 200 as well as network usage information about applications used by devices operating in the radio communication network. Such collected information may include historical information and such collected information may be updated as additional RRC information and network usage information is received. The one or more nodes of the core network 220 may including computing devices such as servers, databases or combinations of the two. In exemplary embodiments, one or more nodes of the core network 220 may process the stored RRC information and the stored network usage information and run heuristic models in near real time to determine whether to enable temporary boosting of transmission power of synchronization signals by one or more of gNB 210, gNB 212 or gNB 214 to reduce synchronization failures by UE devices without disrupting other UE devices or while minimizing impact on other UE devices operating in the radio communication network 200.

In the exemplary embodiment of FIG. 2A, the cluster 202 includes three cells. Particular embodiments may include any suitable number of cells in cluster 202, depending on network requirements, traffic levels and other factors. In typical embodiment, the cluster 202 may include dozens or hundreds of cells. Also, the number of cells in the cluster 202 may vary over time as network usage and build-out change and develop. For example, if the first cell 204 is divided into multiple smaller cells to manage increasing traffic levels, the smaller cells may be added to the cluster 202, increasing the number of cells in the cluster 202.

The radio communication network 200 implements a RAN using radio access technology. In the illustrated example, Third Generation Partnership Project (3GPP) New Radio (NR) 5G cellular network technology is implemented in the radio communication network 200. However, any suitable radio access technology now known or later developed, such as LTE or LTE-Advanced, may be selected and implemented. As noted, the radio communication network 200 may include any suitable number of cells and it is anticipated that the radio communication network 200 will include a large number of cells, such as 100 cells served by 100 respective DUs.

The DUs of gNB 210, gNB 212, and gNB 214 are logical network nodes that perform a subset of eNodeB functions. Each respective DU provides mobile radio communication service to user equipment (UE) devices located in the respective cell served by the respective DU. In the example of FIG. 2A, each respective gNB 210, gNB 212, and gNB 214 includes one DU of the cluster 202 of DUs serving respective geographically contiguous areas defined by the respective cells including first cell 204, second cell 206, and third cell 208 and operating substantially synchronously so that uplink transmissions are substantially synchronous among the gNB 210, the gNB 212, and the gNB 214 of the cluster 202 and downlink transmissions are substantially synchronous among the gNB 210, the gNB 212, and the gNB 214 of the cluster 202 to limit inter-cell interference.

Each DU of each gNB of the radio communication network 200, including first gNB 210, second gNB 212 and third gNB 214, is in communication with the CU 216. In some embodiments, each respective DU is a remote radio head (RRH) or remote radio unit (RRU), providing radio frequency (RF) communication with UE in each respective cell. Each DU may communicate with the CU 216 using fiber optic cable or other means of data communication.

The CU 216 provides control of the respective DUs in the radio communication network 200. The CU 216 is a logical network node that performs a subset of eNodeB or gNB functions. Such functions may include transfer of user data, mobility control, radio access network sharing, positioning, session management, for example. The CU 216 provides baseband central control. The CU 216 generally controls the respective DUs. The split of functionality between the CU 216 and DUs is established by the network operator of the radio communication network 200.

The CU 216 operates in conjunction with the RIC 218. The RIC 218 is a network node that controls certain aspects of the radio communication network 200. The RIC 218 provides access to some functions of the radio communication network 200. The RIC 218 may control operation of the CU 216 and respective DUs in the radio communication network 200.

In the illustrated embodiment, the radio communication network 200 includes a self-organizing network control module 224 and a mobile edge compute control 226. The self-organizing network control module 224 may control implementation of a self-organizing network in the radio communication network 200. A self-organizing network (SON) may include automation technology to make the planning, configuration, management, optimization and healing of mobile radio access networks simpler and faster to achieve. In a self-organizing network, newly added base stations may be self-configured. Currently operating base stations will self-optimize. The self-organizing operation may be coordinated or controlled by the self-organizing network control module 224. The self-organizing network control module 224 may be in communication with other elements of the radio communication network 200. The self-organizing network control module 224 collects network information and performs suitable analysis.

In the mobile edge compute control 226, mobile edge computing, or multi-access edge computer (MEC) enables cloud computing capabilities at the edge of a cellular network such as the network formed by the cluster 202. By running applications and performing related processing tasks closer to the cellular customer, network congestion may be reduced and applications may perform better. MEC technology may be implemented at the cellular base stations or other edge nodes and may enable flexible and rapid deployment of new applications and services for customers.

Communication between a UE device and a base station is conducted using carrier signals of specified frequency. Each base station may use multiple carriers or bands of frequencies to communicate with multiple UE devices in a cell. Each carrier may be referred to as a channel and may have individual channel characteristics besides frequency. In some embodiments, orthogonal frequency-division multiplexing (OFDM) may be used on the downlink (DL) from a base station to a UE device, on an uplink (UL) from the UE device to the base station, or both.

Figure 2B:
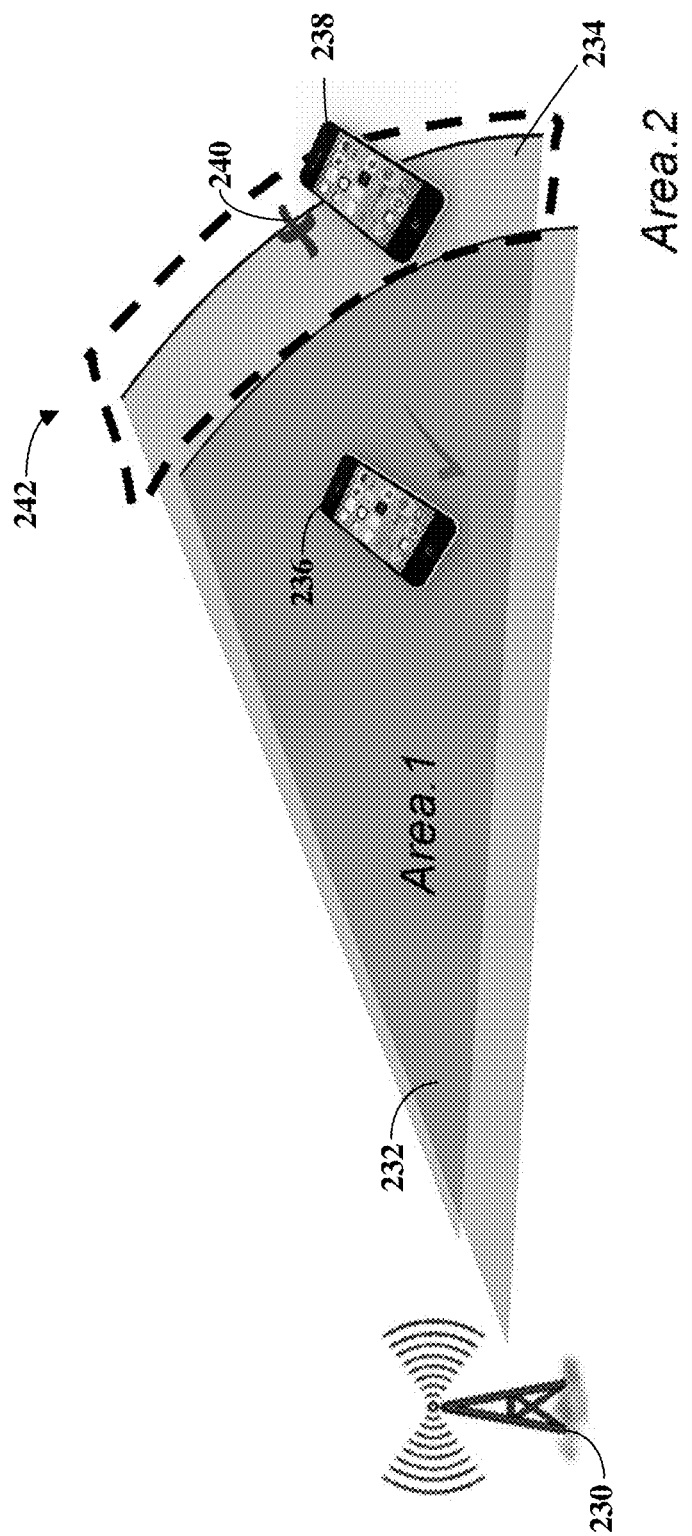
FIG. 2B illustrates a portion of a service area of a base station providing mobile communication services to two UE devices.

FIG. 2B illustrates a portion of a service area 228 of a base station 230 providing mobile communication services to two UE devices, first UE device 236 and second UE device 238. The base station 230 is a portion of radio communication system such as radio communication network 200 of FIG. 2A and may be, for example, a gNB in data communication with other network equipment such as distributed units, a control unit, a core network, a self-organizing network control and a mobile edge computer control. Radio equipment of the base station 230 provides telecommunications services to mobile devices such as first UE device 236 and second UE device 238 in a service area 232 served by the base station. The service area 232 is shown as pie-shaped in the example but may have any suitable shape such as circular in two-space or spherical or toroidal in three-space. The shape of the service area 232 may be controlled by beam-forming technology of the radio equipment of the base station 230. The edge of the service area 232 remote from the base station 230 may be termed the cell boundary 242. The cell boundary 242 is adjacent to a similar cell boundary of an adjacent cell served by a base station similar to the base station 230.

When a UE device such as first UE device 236 and second UE device 238 is initially powered on, the UE device must first synchronize in time and frequency with the base station 230. Similarly, when the UE device moves into the service area 232 of base station 230, the UE device must similarly synchronize with the base station. For synchronization, the UE device must listen for a specific information block to begin a synchronization process. Once synchronized and able to understand messages from the network, the UE device must determine, for example, information such as the physical cell identifier (PCI) of the base station 230.

Before the UE device can operate on the network, it must take these initial synchronization steps. If the UE device is operating in a high-interference environment, the information from the specific information block may be buried in noise. A high interference environment may occur at a cell edge or in an area with many active UE devices. At a cell edge, the signals from the base station may be relatively weak compared to other signals received by the UE device.

When the UE device is powered on or attempts to attach to a network, the UE enters a cell search procedure. Cell search is a procedure by which the UE acquires time and frequency synchronization with a cell or base station and decodes the cell identification information of that cell. In a fifth generation (5G) new radio (NR) system, the cell search concept involves decoding a Primary Sync Signal (PSS) and a Secondary Sync Signal (SSS) to determine a Physical Cell ID (PCI).

In general, there are two methods by which a UE device can access a 5G NR base station or cell. The first method to access a 5G base station is by non-standalone (NSA) deployment, for cells which include both 5G and fourth generation (4G) base stations. This method of access is referred to as EUTRA-NR dual connectivity (EN-DC). In the EN-DC method, cell Search information such as frequency (referred to as new radio absolute radio frequency channel number, NR-ARFCN), physical cell identifier, random access channel (RACH) parameters are provided by the network in a radio resource control (RRC) reconfiguration message transmitted by an LTE eNodeB. The UE can receive and respond to the RACH to access the NR cell.

The second method to access a 5G base station is referred to as standalone (SA) deployment, in an NR only cell. In 5G SA technology, the base station 230 transmits a synchronization signal block (SSB). The UE device tunes to a specific frequency and tries to detect the SSB or its components. In exemplary embodiments, the SSB consists of one orthogonal frequency-division multiplexing (OFDM) symbol for the Primary Sync Signal (PSS), one OFDM symbol for the Secondary Sync Signal (SSS), and two OFDM symbols for the Physical Broadcast Channel (PBCH). Thus, the SSB spans four OFDM symbols in the time domain and 240 subcarriers in the frequency domain. Once the UE successfully detects the PSS and SSS, it can synchronize and determine from the gNB the physical cell identifier or PCI.

A UE device operates according to an assumption that reception occasions of a PBCH, PSS, and SSS are in consecutive symbols and form an SSB. When a UE is powered on or when it enters a new cell, it must be able to find the cell and synchronize to the cell or base station in frequency and time.

If the UE device is at the edge of a service area such as cell boundary 242 of service area 232 or in an area of high interference, such as an area where other UE devices are in radio communication, the UE device may have difficulty reliably detecting the specific information block. The information blocks including the SSB that the UE device needs to receive in order to synchronize to the network may be unintelligible in noisy interference, weak cell edge signals or fading. The UE may need to read multiple SSB messages to obtain required synchronization information.

In some embodiments, transmit power or the signal strength at which the SSB messages and other synchronization information are transmitted by the base station 230 may be increased temporarily to improve the likelihood of reception by UE devices at the cell edge or in high interference areas. Boosting SSB transmit power may help certain UE devices with reception of the downlink signal at the cell edge. For example, a boosted SSB transmit power may improve performance of a channel analyzer or other hardware or software performing the cell search operation. The SSB power can be boosted while keeping the total transmit power of the base station 230 or gNB under configured maximum transmission power. Maximum transmission power may be limited by air interface standards or other sources.

Boosting SSB transmit power allows UE devices at greater distance from the base station 230 or gNB to detect the specific information block for synchronization. This improves the coverage in remote or distant areas such as the region of the cell boundary 242. In some examples, boosting SSB transmit power may result in a faster setup for an NR leg between the UE device and the base station when the UE device is operating as EN-DC. In that case, the UE device will detect and read the SSB faster and in a more reliable manner. In an example, transmit power of the SSB can be boosted up to 5 dB in a channel with 100 MHz bandwidth or 2 dB in a channel with 50 MHz bandwidth by using power from other unused physical resource blocks (PRBs) in the SSB subframes. The gNB communicates information about the SSB transmit power to the UE device in a message transmitted by the gNB to the UE device. For example, a message referred to as the system information block type 1 (NR-SIB1) message may be used for this purpose. SSB transmit power is indicated in the SIB1 message via the parameter ss-PBCH-BlockPower in ServingCellConfig-CommonSIB. The physical broadcast channel is referred to as PBCH. The message ServingCellConfigCommonSIB is an object of the NR-SIB1 message, and it is used to configure cell specific parameters of a serving cell. Table 1 shows exemplary SIB parameter information.

TABLE 1

| ServingCellConfigCommonSIB | |
| --- | --- |
| downlinkConfigCommon | DownlinkConfigCommonSIB |
| uplinkConfigCommon | UplinkConfigCommonSIB |
| supplementaryUplink | UplinkConfigCommonSIB |
| n-TimingAdvanceOffset | ENUMERATED [n0, n25600, n39936] |
| ssb-PositionsInBurst | \|InOneGroup BIT STRING (SIZE (8)) |
|  | \|groupPresence BIT STRING (SIZE (8)) |
| ssb-PeriodicityServingCell | ENUMERATED [ms5, ms10, ms20, ms40, ms80, ms160] |
| tdd-UL-DL-ConfigurationCommon | TDD-UL-DL-ConfigCommon |
| ss-PBCH-BlockPower | INTEGER (−60 .. 50) |

Boosting SSB transmit power by the base station 230 will increase coverage in the new radio downlink, from the base station to UE devices in the region of the cell boundary 242. However, coverage in the new radio uplink, from the UE devices to the base station, may be negatively impacted. Increasing SSB transmit power may create a downlink/uplink unpairing effect. In other words, UE devices will be able to detect the physical cell identifier (PCI) for the base station 230 but base station may not be able to hear the UE devices because of the boosted power of the SSB.

FIG. 2B illustrates one example of this. Without boosting the transmit power of the SSB, cellular coverage is provided by the base station 230 to the coverage area or service area 232. That is, coverage area or service area 232 is illustrates downlink coverage without SBB boosting. The UE device 236, operating in the coverage area or service area 232, is in an area where uplink coverage with the base station 230 matches downlink coverage from the base station 230.

Coverage area 234 illustrates the cellular coverage area with SSB transmit power boosting. Because of the SSB power boosting, the coverage area 234 which can reliably receive the SSB from the base station 230 is increased in area. The radius of the coverage area, or distance from the base station 230 at which the SSB can be reliably received, is greater than the coverage area or radius of service area 232. As a result, UE devices such as UE device 238, which are located in the cell boundary 242 of service area 232 such as location 240, are able to reliably receive the boosted SSB from the base station 230. Since the UE device 238 can detect the boosted SSB, the UE device 238 can detect the PCI of the base station 230 and therefore synchronize to the base station 230.

However, in the area of the cell boundary 242 of service area 232, UE devices such as UE device 238 will be able to detect the PCI of the gNB or base station 230, but the base station 230 or gNB will not be able to detect radio communications from the UE device 238. The transmission power of the UE device 238 may be insufficient to reliably be received at the base station 230. Noise and interference from other UE devices in the area of the cell boundary 242 may clash with transmissions from the UE device 238 and prevent the base station from reliably receiving the transmissions from the UE device 238. As a result, a session cannot be setup or maintained. The UE device 238 may try to connect or hand over to the gNB or base station 230 multiple times, successfully or unsuccessfully. The repeated attempts to connect or hand over may result in excessive battery drain in the UE device 238.

Figure 2C:
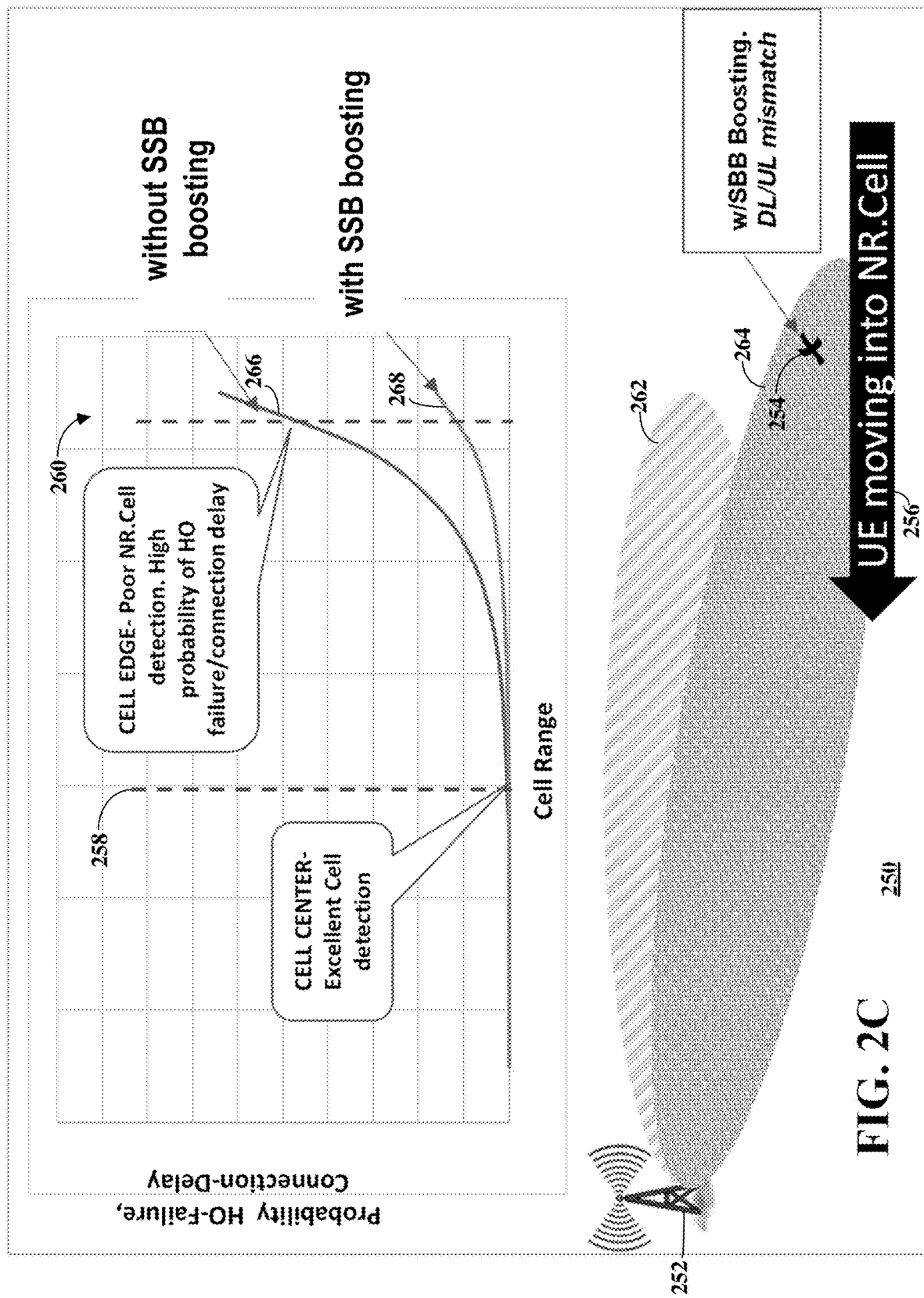
FIG. 2C illustrates relative probability of communication failure for a user equipment device moving in a cellular coverage area.

FIG. 2C illustrates relative probability of communication failure for a user equipment device moving in a 5G cellular coverage area 250 provided by a NR base station 252. A new radio UE device is located at a position 254 and is moving in the direction indicated by arrow 256.

FIG. 2C includes a qualitative plot showing a probability of handover failure and connection delay for a UE device operating near the cell center 258 and for a UE device operating in the area of the cell edge 260. At the cell center 258, the environment is relatively low-noise and the signals from the base station 252, including SSB, are relatively strong. As a result, the probability of a handover failure or of a connection delay is relatively low, near zero probability as measured on the ordinate of the plot.

In the area of the cell edge 260, the environment may be relatively more noisy with more interference. The UE device at location 254 may detect signals from the base station 252 serving the cell in which the UE device is located. However, the UE device at location 254 in the area of the cell edge 256 may also detect signals from adjacent cells. As a result, the probability of a handover failure may be increased to a significant, non-zero probability. UE devices at cell edge may not be able to detect the PCI from the NR base station 252 due to fading and interference issues. The UE device may need to read multiple SSB messages transmitted by the NR base station 252 in order to properly decode the cell information including the PCI. This issue may result in connection delay, meaning the amount of time required for the UE device to synchronize with the target NR base station 252. This issue may also result in handover failure if the UE device cannot synchronize with a new, target base station when handing off from an established connection with an old base station.

In exemplary embodiments, boosting SSB transmit power from the NR base station 252 can improve UE detection and synchronization to the target NR cell PCI. However, increasing SSB transmit power may create a downlink/uplink footprint mismatch and impact UE devices located in overlapping area with neighboring cell, as illustrated for the UE device located at position 254.

FIG. 2C illustrates qualitative cell coverage areas for the NR base station 252 with and without SSB transmit power boosting. A first coverage area 262 illustrates cell coverage for the base station 252 with no SSB boost. A second coverage area 264 illustrates cell coverage for the base station 252 when SSB boost is used and transmit power for the SSB information block is increased. The second coverage area 264 extends a distance farther from the base station 252 due to the transmit power increase. A UE device at location 254 will have a higher probability of receiving the SSB signal with the increased transmit power, as illustrated by the second coverage area 264. However, the location 254 may actually overlap with a coverage area of the adjacent cell, to the right of the coverage area 264 illustrated in FIG. 2C. The stronger the power-boost, or increase in SSB transmit power, the bigger the overlapping-area and therefore more UEs may be impacted. Current 3GPP implementation does not take into consideration quality of experience (QoE) of UE devices in the overlapping area when adjusting SSB power-boosting.

FIG. 2C illustrates qualitatively the effect of SSB boosting. The plot of relative probability of communication failure in FIG. 2C includes a first line 266 showing a relative probability of handover failure or connection failure without use of SSB boosting by the base station 252. The plot further includes a second line 268 showing a relative probability of handover failure or connection failure when SSB boosting is used by the base station 252. The second line 268 shows a lower probability of handover failure or connection failure at all distances from the base station 252 (the abscissa in the plot of FIG. 2C) compared with the first line 266. Use of SSB boosting tends to pull the first line 266 down toward the second line 268 and to reduce the probability of handover failure or connection failure by a use device with the base station 252.

The situation illustrated in FIGS. 2B and 2C in which a UE device may experience delay in attaching to a network or experience a higher probability of handover failure due to inability to detect the cell PCI transmitted by a NR base station may happen many times in a day for a particular UE device. In particular, the situation may occur any time the UE changes technologies (i.e., from an LTE connection to a 5G connection, or vice versa), or changes networks, or hands over from one cell to another. If the UE device drops a call because the UE device is in a high interference area or weak coverage area and the UE device has to reacquire the network, the situation can happen multiple times. Also, every time this situation occurs, it affects the individual UE device and other network components as well. For the UE device to attach or reattach to the network requires time and power and it also injects additional noise into the network at a place where interference is already relatively high.

As noted, increasing SSB transmit power on the downlink may create a downlink/uplink footprint mismatch and impact UE devices located in overlapping areas with neighboring cells, as illustrated for the UE device located at position 254. The downlink is boosted but the uplink power from the UE device remains unchanged. In that circumstance, a UE device at position 254 in the area of the cell edge 260 may be able to hear or receive the boosted SSB signal in the second coverage area but will not be able to reply to eh SSB signal. The transmit power for the UE device corresponds to the un-boosted first coverage area 262 so that transmissions by the UE device at position 254 are not detectable by the NR base station 252. The first coverage area 262 and the second coverage area 264 illustrate the downlink/uplink footprint mismatch. The second coverage area 264 creates an overlapping area with a coverage area of an adjacent cell to the right in FIG. 2C. UE devices in the overlapping area can be negatively affected by SSB boosting and try to connect with a base station and cell that cannot hear or receive signals from the UE device.

Previous generations of cellular technology, such as 2G, 3G and 4G or LTE, had the ability to boost base station transmit power. However, the ability to boost power was limited to boosting overall transmit power, for example, to the entire cell or coverage area. 5G cellular standards provide the ability to boost SSB only. The cellular standard provides much more granular control of signal power for individual signals. The 5G standard gives a network operator more opportunities to control features in an operational network. Previously, the network operator would have to rely on features implemented in the air interface standard or by the equipment vendor developing, for example, a base station.

Figure 2D:
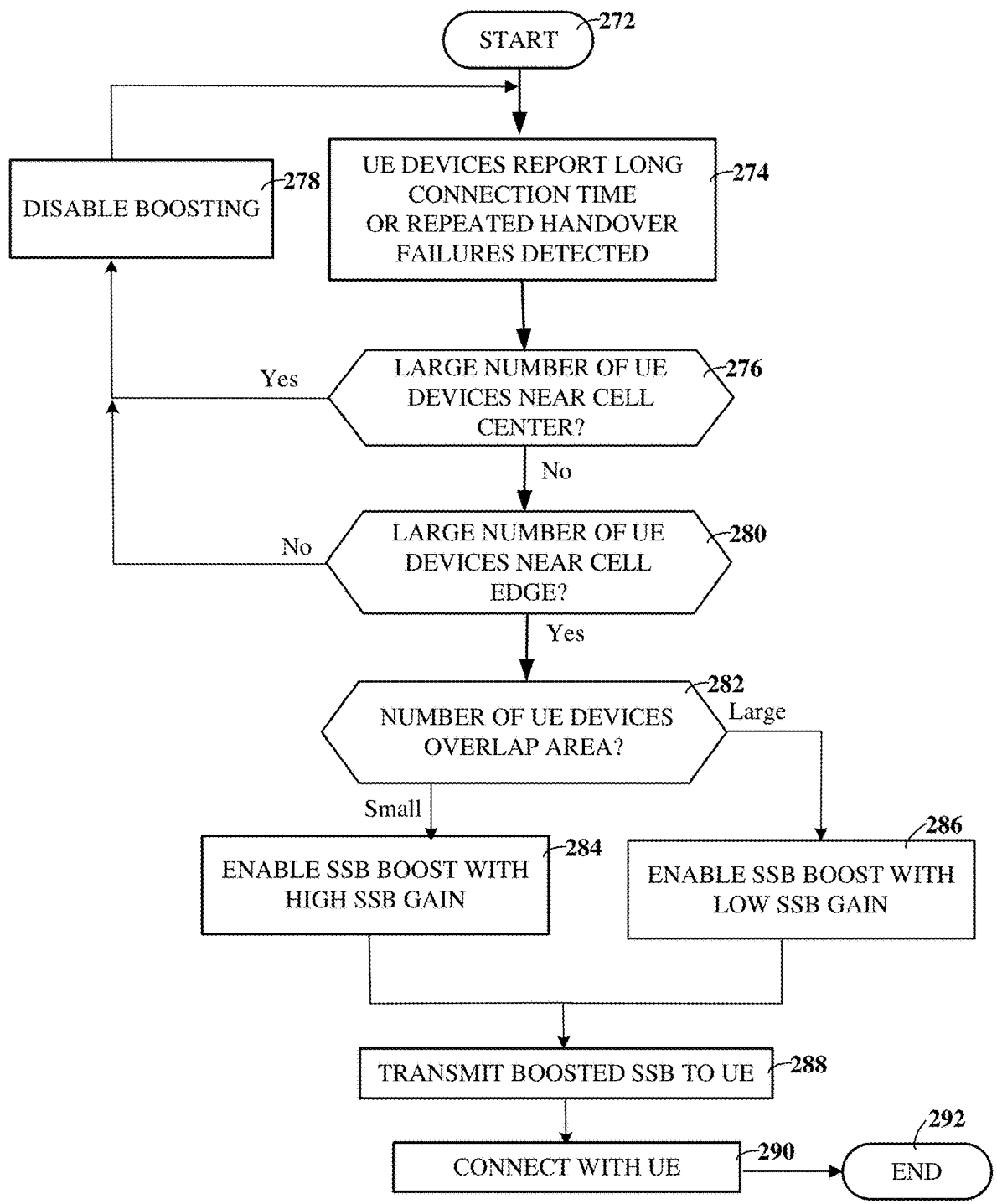
FIG. 2D depicts an illustrative embodiment of a method in accordance with various aspects described herein.

FIG. 2D depicts an illustrative embodiment of a method 270 in accordance with various aspects described herein. To reliably adjust SSB power to provide sufficient signal boosting to UE devices at a cell edge, FIG. 2D illustrates an exemplary methodology to adjust SSB power-boost based on quality of experience for the UE device (UE-QoE) over a 5G Network. QoE is a user perceived factor related to use of multimedia services. QoE is related to factors such as mean opinion score (MOS) for voice quality in a voice communication network.

In general, a method in accordance with FIG. 2D includes collecting, storing and processing information about activities of gNB devices and UE devices in a network such as the radio communication network 200. The collection of information may be part of an algorithm or process that manages decisions for one or more or all gNB devices to boost SSB transmit power to respective UE devices trying to attach to a cell. In an example, multiple UE devices are experiencing a delay in connecting to a gNB device. This may be reflected in, for example, key performance indicators detected, monitored and reported by one or more gNB devices. Detection that a number of UE devices are experiencing the same condition initiates the process.

If the process determines that a gNB has connection failure issue or a handover failure issue, the process considers locations of UE devices in the service area of the gNB. For example, if man UE devices are reporting a connection failure, the method determines first if a relatively large number of UE devices is located near the center of the service area of the cell. Any suitable standard may be used to decide how many UE devices constitutes a large number. The number may be a percentage or other ratio of active devices in the cell. If a large percentage of UE devices is near the cell center, the process will conclude that SSB transmit power boosting should not be enabled. No boosting will be applied for UE devices currently in the cell.

In another location, at a different gNB, a relatively large number of UE devices may be located at the cell edge. Because of that, there are a relatively large number of handover failures and connection delays. This situation may be detected, for example, in KPI data for the gNB. This situation may be corrected by boosting the SSB transmit power for the cell.

If there is a relatively small number of UE devices in an overlapping area between the coverage area of the gNB and an adjacent gNB, further processing may be based on a relative number of UE devices in the overlapping area. UE devices in the overlapping area may be affected by the boosted SSB signal. Boosting the SSB signal power will improve performance of some UE devices in the network. However, the performance of some UE devices in the overlapping area will be negatively affected. Boosting SSB power can improve UE detection of the SSB signal and synchronization by UE devices to the gNB PCI. However, boosting the SSB power may create a downlink/uplink footprint mismatch as illustrated in FIG. 2C. This can impact UE devices located in the overlapping area with neighboring cell. The stronger the power boost, e.g., from 0 dBm to 1 dBm to 2 dBm, the bigger the overlapping area and therefore more UE devices may be impacted. One goal of the method 270 is to improve performance for a group of UE devices in the overlapping area that are experiencing connection failures. However, some other UE devices will be negatively affected if they are in the overlapping area.

If the relative number of UE devices in the overlapping area is small, the algorithm will enable SSB power boosting with a relatively large power boost. Since the number of UE devices in the overlapping area is small, meaning that the number of UE devices that will experience mismatch in their uplink and downlink coverage is relatively small, the SSB power is increased substantially to help the relatively larger number of UE devices experiencing connection failure. The tradeoff is sacrificing some performance for the small number of devices in the overlapping coverage area in favor of improving performance for a relatively larger number of UE devices located near the cell edge and experiencing connection failures.

If the relative number of UE devices in the overlapping area is large, the algorithm will enable SSB power boosting but with a relatively small power boost. If the majority of users are in the overlapping area, the SSB power will be boosted but with a relatively low power gain. In this manner, the UE devices near the cell edge experiencing connection failure or handover failure get some benefit from the power boost and may improve connection success rate, handover success rate, or other KPIs. However, in the case, the majority of UE devices in the overlapping area are not impacted, or are impacted less, by the SSB power boost. The uplink and downlink mismatch will affect fewer UE devices in the overlapping area.

The methodology may be performed by hardware, software or any combination of the two. The methodology can be performed by a device located at any convenient location in a network such as the radio communication network 200 of FIG. 2A. This can include, in various embodiments, a base station or gNB, a central node global control function located on the core network 220, at a mobile edge compute (MEC) control 226, at a self-organized network (SON) control 224 or a RAN Intelligent Controller (RIC) 218. Further, the methodology or algorithm may be distributed over several network devices in data communication with each other. Locating the functionality in a central or common network location, rather than an individual gNB, allows the functionality or algorithm to make decisions for several, many or all gNB devices in the radio communication network 200.

The information that is collected and shared for each UE device may include radio access network (RAN) information or radio resource control (RRC) information for one or more gNB devices or other network devices. Such information may include information about delays in connecting UE devices with a cell or information about handover failures by a UE device among two or more base stations. Such information may be collected from any suitable source, such as respective UE devices and respective gNB devices.

Further, the information that is collected and shared for each UE device may include network or internet protocol (IP) related information, such as what applications a respective UE device is currently using. Other collected and shared information may include information about existing data sessions underway at the UE device and information about activities of the UE, such as whether the UE device is currently using voice over internet protocol (VoIP) or video conferencing, for example. Such information may be readily available from one or more servers or nodes of the core network, such as core network 220 of radio communication network 200 (FIG. 1A).

Such RAN information and IP information may reflect the quality of service (QoS) assigned to the user or the UE device or a data session. In some examples, the QoS may correspond to a first responder device having highest priority, for example, and being assigned a relatively high QoS level for network connections.

All this information may be shared among network elements to inform a decision about boosting transmit power for an SSB for a particular UE device. A node in the core network 220 has ready access to all information about each UE device and information about network activity and may have available greater processing power to process information about some or all UE devices active in the network. Further, such information and conclusions about such information including SSB power boost decisions, can be readily communicated from the core network 220 or other network elements to a gNB that should boost an SSB transmit power to a particular UE device.

Further, the relative success or failure of a decision to boost an SSB transmit power for a particular UE under particular conditions becomes part of the information used to make future decisions to boost or not boost SSB power. The algorithm or functionality may make a mistake and determine to boost SSB power to a particular UE under particular network conditions. If the boosted SSB power does not result in improved operation or performance, such as reduced connection time for the UE device, or results in worse network conditions, that mistake or failure may be used in future decisions. This is another benefit of centralizing the decision to boost SSB transmit power for respective gNB devices. In some applications, an artificial intelligence (AI) process may be implemented and trained with suitable network operation data.

In a very dense portion of the network or coverage area, a UE device may be in a high interference area because the area is densely populated with eNodeB devices and gNB devices serving the area. Therefore, a centralized node such as a SON or MEC or RIC, could decide not to implement SSB power boosting so that it would not interfere with other gNB devices.

The methodology or algorithm collects statistics and key performance indicators (KPIs) for UE devices and for base stations in the radio communication network 200. Key Performance Indicators reflect network measurements. Examples of values that may be collected in embodiments include handover failure statistics and radio resource control (RRC) connection Failure. Other examples of values or information to be collected include UE device application requirements, such as data rate and delay and UE device location with respect to the base station in a cell, such as cell-center or cell-edge. Each gNB has information about how long a connection takes to complete and information about failed handovers. The gNB can share this information with a centralized global control function at a MEC control 226, a SON control 224, a RIC 218 or a node in the core network 220. Further, each gNB has information about location of UE devices in the coverage area served by the gNB. The gNB can infer this information from the UE, for example. When the UE device connects to the gNB, the relative strength of the modulation coding scheme may be used by the gNB as an indicator of relative distance from gNB. Based on the modulation coding scheme used by a UE device, the gNB can infer a distance between the gNB and the UE device. Generally, the gNB can use the modulation coding scheme to conclude the UE device is relatively near the center of the cell or relatively distant from the center of the cell, at the cell edge. The gNB can track a percentage of UE devices having a relatively weak modulation coding scheme and conclude what percentage or mix of UE devices are near the cell edge or near the cell center.

Based on the collected information about devices in the radio communication network 200, the algorithm runs heuristic models in real time to decide whether or not to enable SSB transmit power boost in a specified base station or gNB. Further, the algorithm decides the amount of SSB transmit power boost to be used. Example transmit power boost levels include 1 dBm, 2 dBm, 3 dBm, etc. Other values may be used as well. The algorithm will evaluate the benefits of boosting SSB for a UE device located at a cell edge area while minimizing the impact of SSB boosting for UE devices located in an overlapping-area that includes the cell edge area and which may be connected to a neighboring gNB cell.

Referring to FIG. 2D, method 270 illustrates and exemplary method for determining to boost transmit power for a synchronization signal block (SSB) in a radio communication network such as radio communication network 200 of FIG. 2A. The method 270 may be implemented as one or more heuristic models. A heuristic or heuristic model is an approach to problem solving that employs a practical method that is not guaranteed to be perfect but is nevertheless sufficient for reaching an immediate, short-term goal or approximation.

The method begins at block 272. The method may be initiated by any suitable activity or occurrence in a network. In some embodiments, the method 270 may run continuously as a background process to monitor network conditions and initiate corrective activity in the network. The method may include a process for providing control and reporting information about network operations and key performance indicators to network operations personnel.

At block 274, information about network performance and network activities by respective UE devices and respective base station devices, also referred to an eNodeB devices and gNB devices, is collected. Such information may include radio access network information, such as success rate of connections to the network by UE devices or connection failures. Such information may include information about success rate of handovers by UE devices among base stations. Such information may include information about data communication rates between a UE device and a serving base station as well as information including an inferred estimate of location information for each UE device. For example, the serving base station may infer that the UE is near the cell center or distant from the cell center, nearer the cell edge, where the cell includes the service area served by the base station. Such information may include information about whether a UE device is located in an overlap area between the current cell and an adjacent cell, where the overlap area is associated with a boosting of transmit power for an SSB signal. Such information may further include information about activities or applications of each particular UE device, such as whether the UE device is currently engaged in a data session and requirements for applications that are active on the UE device. For example, if the UE device is engaged in a voice call or a data streaming session, QoS or QoE may require particular processing of network connections for the UE device.

The information detected and reported at block 274 may be collected and stored in any suitable location in the network. For example, if the method 270 is performed at a node of a core network, the information may be reported to that network node and stored in that network node or in an associated database or other storage. Storage may be distributed among several devices and information may be updated as additional network information become available.

In an example, multiple UE devices are experiencing a delay in connecting to a gNB device. This may be reflected in, for example, key performance indicators detected, monitored and reported by one or more gNB devices. Detection that a number of UE devices are experiencing the same condition initiates a response in method 270.

At block 276, the method 270 determines if a large number of UE devices are located near the cell center. UE location may be reported by the UE devices or inferred by the gNB. The proximity of the devices may be compared with a threshold such as 500 meters or 1 km. Further, the threshold may be variable based on physical size of the service area and number of UE devices active in the cell. The number of devices also may be compared with a threshold. Thus, the comparison of block 276 may be stated in an example as, are more than 80% of the active UE devices within the 0.5 km of the particular base station?

If the condition is true, the cell is operating normally. There is a manageable degree of connection failure and handover failure in the cell. There is no need to boost SSB transmission because a large percentage of UE devices are located near the base station and, for example, not in an overlap area at the edge of the cell. Therefore, at block 278, boosting of SSB is disabled or not enabled for this UE device at this gNB. Control returns to block 274 to continue monitoring operational information.

At block 280, it is determined if there is a large number of UE devices near the cell edge. The relative number of UE devices may be set according to any standard, such as by comparison with a percentage or other threshold. Also, proximity to a cell edge may be determined according to any suitable standard, including inferring a location of a respective UE device by a base station. Service areas may have different sizes and shapes and therefore the determination of block 280 may be individualized for each base station each particular time. The number and locations of UE devices active in the cell will change over time. At some point in time, the test of block 280 may set to true. If there is not determined to be a large number of UE devices near the cell edge, control SSB boosting is not enabled for this cell and this particular UE. Control returns to block 274 to continue monitoring operational information.

In some embodiments, block 280 may also or instead determined if there is a large number of UE devices experiencing synchronization failure. Synchronization failure may include, for example difficulty or delay in connecting to the base station serving the cell. Synchronization failure may include difficulty or failure to successfully hand over to the base station serving the cell. The relative number of UE devices experiencing synchronization failure may be set according to any standard, such as by comparison with a percentage or other threshold. For example, if 80 percent of UE devices located near the cell edge experience synchronization failure, the test of block 280 may set to true.

If the test of block 280 is true, at block 282, the method determines a number of devices in a cell overlap area. The overlap area may be defined in any suitable manner. In an example, there are multiple overlap areas, where each overlap area is defined by a possible SSB boost value. For example, if SSB is boosted from a normal or standard value by 1 dBm, the service area in which the SSB can be detected by a UE device is increased by an associated amount, such as a greater radius from the physical location of the base station. The greater radius extends into a coverage area of one or more adjacent cells, creating an overlap area where SSB signals and other signals may be detected by the UE from multiple base stations. In another example, if the SSB transmit power is boosted by 2 dBm, the service area in which the SSB can be detected by a UE device is increased by a larger associated amount, such as a greater radius from the physical location of the base station. The greater radius extends into a larger coverage area of one or more adjacent cells, creating a larger overlap area.

The method 270 determines the overlap area and further determines the number of UE devices located in the overlap area. Location determination may be by any suitable method, such as inferring a location from signals received by the gNB. In the case of a handover of an existing connection with an adjacent gNB, the adjacent gNB may have accurate information about location of the UE device, such as from global positioning system (GPS) reporting. The method 270 preferably has access to any available information.

If, at block 282, the number of UE devices in the overlapping area is relatively small, at block 284, the method 270 includes enabling SSB boosting for UE devices but with a relatively high SSB gain. In contrast, if, at block 282, the number of UE devices in the overlapping area is relatively large, at block 284, the method 270 includes enabling SSB boosting for UE devices but with a relatively low SSB gain. Whether the number of UE devices in the overlapping area is large or small may be determined in any suitable manner. For example, the number of UE devices determined at block 282 may be compared with a threshold value such as 5 devices or 10 devices. The threshold value may be a percentage or ratio, such as 10 percent of all active devices connected to the cell at a particular time, or 25 percent of all devices active in the cell. The threshold value may include information about activity of respective UE devices, such as if a UE device is engaged in a voice call or data streaming session while in the overlapping area. To prevent a dropped call, the threshold of block 282, block 284 and block 286 may be adjusted. Information about QoS and QoE requirements for a particular UE device or group of UE devices may be used to adjust the threshold.

The amount of SSB transmit power which is considered a high SSB gain (block 284) or a low SSB gain (block 286) may be selected in any suitable manner. In one example, a nominal or unboosted SSB gain is set a 0 dBm. A low SSB boost may be established at 1 to 2 dBm for block 286 and a high SSB boost may be established at 3 to 4 dBm for block 284. Other factors may be used for adjusting the SSB transmit power boost as well.

At block 288, the SSB is transmitted to the particular UE device or group of UE devices by the base station. In an embodiment in which the method 270 is performed at, for example, a node of the core network 220, the node of the core network may send a network communication to the base station to initiate transmission of the SSB. The network communication may indicate, for example, identification information for the base station, identification information for one or more UE devices, timing information and frequency information for transmission of the SSB and a boosted power level for transmission of the SSB. The base station responds to the network communication by transmitting the SSB for reception by one or more UE devices. The UE device conducts the conventional synchronization process with the base station. In some embodiments, this includes decoding a primary sync signal (PSS) and a secondary sync signal (SSS) from the base station to identify the physical cell identifier (PCI) of the base station. Once the UE device acquires time and frequency synchronization with the cell, at block 290 the UE device connects with the cell and the network and conventional processing of communication between the network and the UE device can begin. The method ends at block 292.

In some embodiments, the method 270 may be implemented as one or more heuristic models. The heuristic models may be run substantially in real time, responsive to information collected about individual devices and network elements, such as in block 274. Results of the heuristic models may be used to decide whether to enable SSB transmit power boost in a specified base station or gNB. Further, the heuristic model may be used to decide the amount of SSB transmit power boost to be used at a given time for a given UE device or group of UE devices.

Use of a heuristic model in conjunction with the method 270 may be useful for balancing tradeoffs of improved performance for some UE devices, such as those near a cell edge, against a possible decrease in performance for some other UE devices, such as those in the overlapping area. Heuristics are methods for solving problems in a quick way that delivers a result that is sufficient enough to be useful given time constraints. Since the method 270 may need to process substantial data, in substantially real time, to account for changing network conditions and traffic level, a "close enough" solution can be very effective. In some examples, heuristics can lead to poor decision-making based on a limited data set, but the speed of decisions can sometimes make up for the disadvantages. In accordance with the method 270, the results of prior heuristic analyses are accumulated with other information at block 274 and form part of the knowledge base on which the decision to boost SSB power, and by how much, is made. In embodiments, the method 270 learns from its past mistakes and successes in managing network performance.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram of a virtualized communication network 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of radio communication network 200, and method 270 presented in FIGS. 1, 2A, 2B, 2C, 2D, and 3. For example, virtualized communication network 300 can facilitate in whole or in part identifying user equipment devices experiencing synchronization failure with a base station in a radio network and enabling temporary, localized boosting of synchronization signals by the base station to facilitate synchronization by the user equipment devices without disrupting other user equipment devices in the coverage area of the base station.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
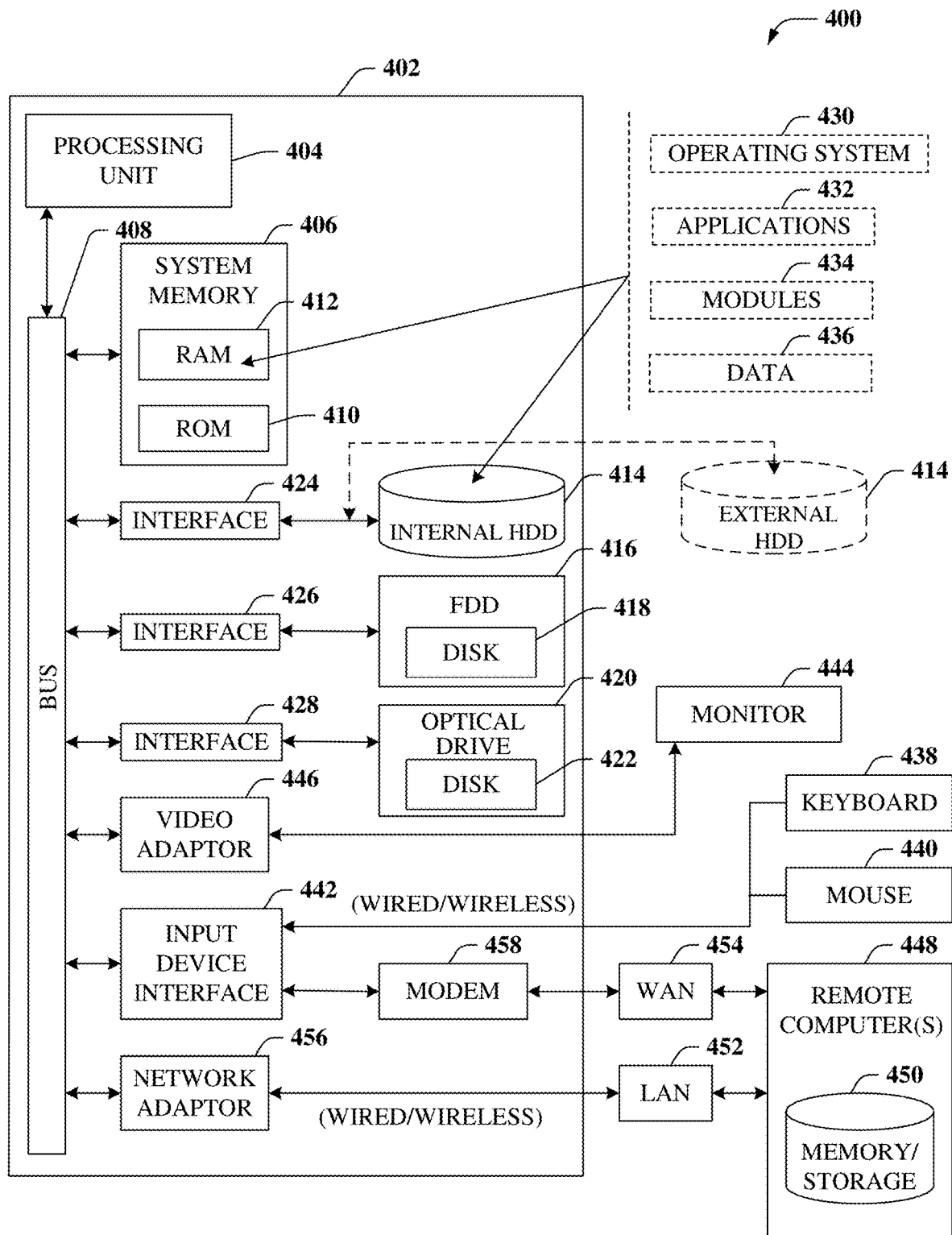
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying user equipment devices experiencing synchronization failure with a base station in a radio network and enabling temporary, localized boosting of synchronization signals by the base station to facilitate synchronization by the user equipment devices without disrupting other user equipment devices in the coverage area of the base station.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
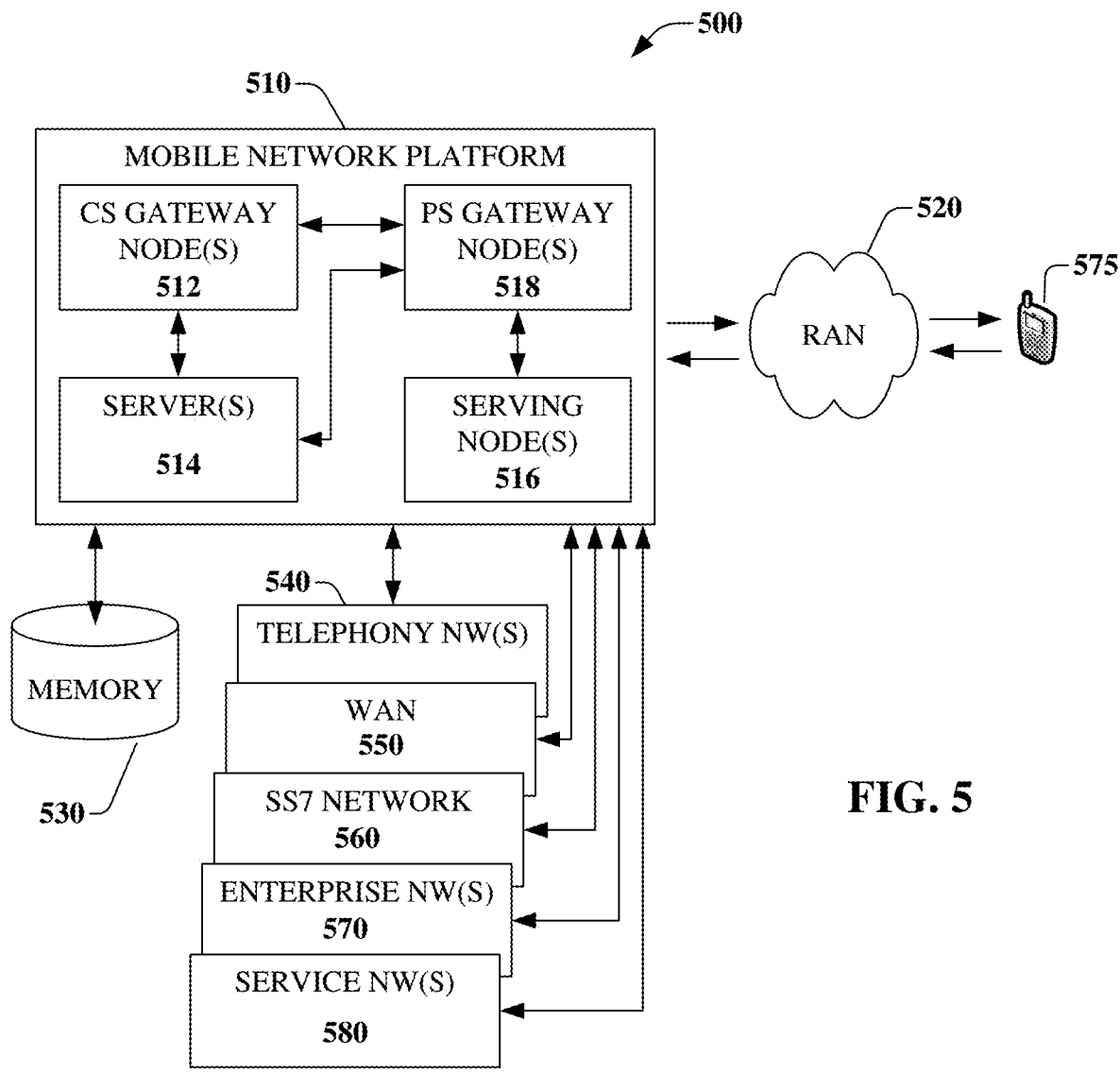
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part for identifying user equipment devices experiencing synchronization failure with a base station in a radio network including the mobile network platform 510 and enabling temporary, localized boosting of synchronization signals by the base station to facilitate synchronization by the user equipment devices without disrupting other user equipment devices in the coverage area of the base station. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CSbased traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
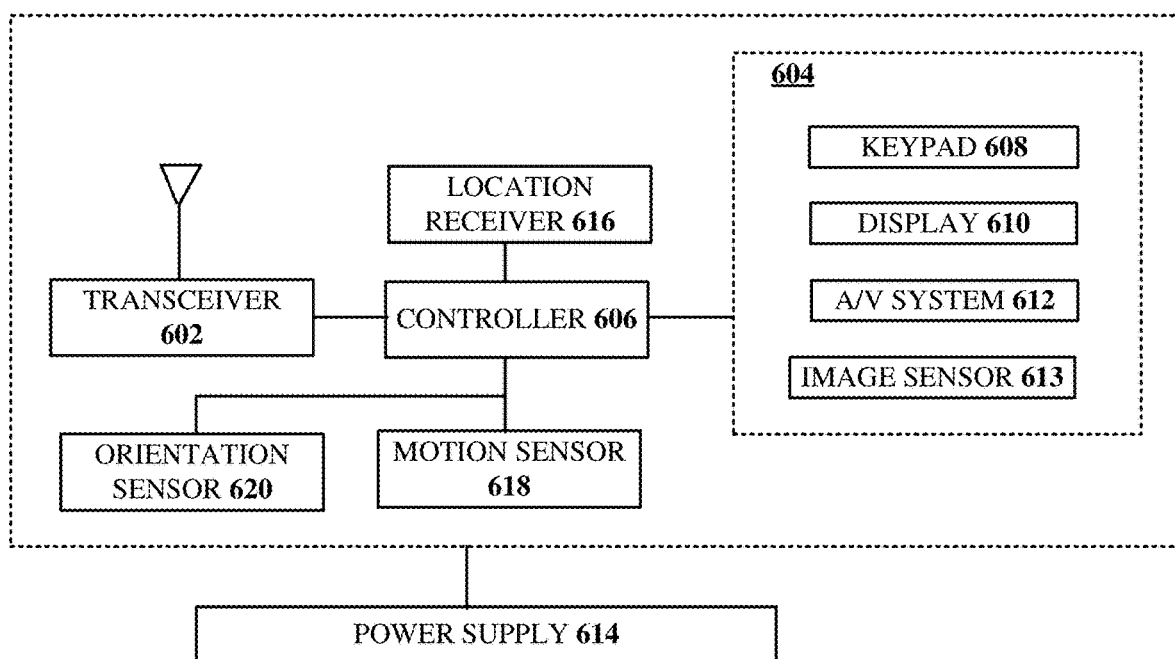
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying user equipment devices such as computing device 600 experiencing synchronization failure with a base station in a radio network and enabling temporary, localized boosting of synchronization signals by the base station to facilitate synchronization by the user equipment devices without disrupting other user equipment devices in the coverage area of the base station.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, ... , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to pre- determined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs.

Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
a processing system including a processor; and a memory that stores executable instructions that, when executed by the processing system, facilitate performance of operations, the operations comprising:

collecting performance information for a plurality of user equipment (UE) devices and at least one base station in a radio communication network, wherein the performance information includes at least connection failure information and handover failure information for the plurality of UE devices and the at least one base station;

determining, based on the performance information, that one or more UE devices of the plurality of UE devices experience a synchronization failure attempting to connect to one base station of the at least one base station;

determining a first number of UE devices experiencing the synchronization failure;

determining a second number of UE devices in an overlapping area of cell coverage of the one base station;

based on the first number of UE devices and the second number of UE devices, determining to temporarily boost a transmit power of a synchronization signal block by the one base station to facilitate synchronization between the one base station and the first number of UE devices experiencing the synchronization failure;

based on at least the second number of UE devices, determining a boosted power level of the transmit power of the synchronization signal block by the one base station to minimize disruption to the second number of UE devices in the overlapping area of cell coverage of the one base station;

initiating transmission of the synchronization signal block by the one base station at the boosted power level; and connecting one or more of the first number of UE devices to the one base station, wherein the connecting comprises obtaining time synchronization and frequency synchronization on a radio link between the one or more of the first number of UE devices and the one base station.

2. The device of claim 1, wherein the determining to temporarily boost transmit power of a synchronization signal block comprises:

determining a quality of experience of respective UE devices of the second number of UE devices in an overlapping area; and determining to temporarily boost transmit power of a synchronization signal block based on the quality of experience of respective UE devices of the second number of UE devices.

3. The device of claim 2, wherein the operations further comprise:

determining a quality of service level assigned to a current data session of the respective UE devices of the second number of UE devices in an overlapping area; and determining to temporarily boost transmit power of a synchronization signal block based on the quality of service level assigned to the current data session of the respective UE devices of the second number of UE devices.

4. The device of claim 3, wherein the operations further comprise:

determining the quality of service level corresponds to a voice call or streaming data for a current data session of one or more UE devices of the respective UE devices of the second number of UE devices in an overlapping area; and deferring temporarily boosting transmit power of a synchronization signal block based on the determining a voice call or streaming data for the current data session of the one or more UE devices.

5. The device of claim 4, wherein the operations further comprise:

determining the quality of service level corresponds to a voice call or streaming data for a current data session of one or more UE devices of the respective UE devices of the second number of UE devices in an overlapping area; and determining a boosted power level of the transmit power of the synchronization signal block by the one base station to minimize disruption to the voice call or the streaming data for the current data session of the one or more UE devices.

6. The device of claim 1, wherein the collecting performance information comprises:

collecting radio resource control (RRC) information for the plurality UE devices and the at least one base station in the radio communication network; and collecting network usage information about applications currently being used by the one or more UE devices.

7. The device of claim 6, wherein the collecting RRC information comprises:

collecting information about one or more key performance indicators of UE devices including the plurality UE devices and base stations including the at least one base station in the radio communication network, forming collected network information; and storing the collected network information at a server of a core network in data communication with the radio communication network.

8. The device of claim 1, wherein the determining to temporarily boost transmit power of a synchronization signal block by the one base station comprises:

comparing the first number of UE devices experiencing the synchronization failure with a threshold value; and if the first number of UE devices experiencing the synchronization failure exceeds the threshold value, determining to temporarily boost the transmit power of the synchronization signal block.

9. The device of claim 1, wherein the determining a boosted power level of the transmit power of the synchronization signal block by the one base station to minimize disruption to the second number of UE devices in the overlapping area of cell coverage of the one base station comprises determining a boosted power level of the transmit power of the synchronous signal block to minimize a downlink/uplink mismatch for UE devices of the second number of UE devices in the overlapping area of cell coverage.

10. The device of claim 1, wherein the determining that one or more UE devices of the plurality of UE devices experience a synchronization failure attempting to connect to the one base station of the at least one base station comprises determining the one or more UE devices experiences a connection failure information or a handover failure.

11. A non-transitory machine-readable medium, comprising executable instructions that, when executed by a processing system including a processor, facilitate performance of operations, the operations comprising:

collecting performance information for a plurality of user equipment (UE) devices and at least one base station in a radio communication network;

determining, based on the performance information, that one or more UE devices of the plurality of UE devices experience a synchronization failure attempting to connect to a base station of the at least one base station;

determining to temporarily boost transmit power of a synchronization signal block by the base station to facilitate synchronization between the base station and the UE devices experiencing the synchronization failure;
determining a boosted power level of the transmit power of the synchronization signal block by the base station to minimize disruption to UE devices in an overlapping area between a first cell coverage area of the base station and a second cell coverage area of an adjacent base station;
initiating transmission of the synchronization signal block by the base station at the boosted power level for reception by the UE devices experiencing the synchronization failure; and
connecting one or more UE devices to the base station, wherein the connecting comprises obtaining time synchronization and frequency synchronization on a radio link between the one or more UE devices and the base station.

12. The non-transitory machine-readable medium of claim 11, wherein the collecting performance information comprises collecting at least connection failure information and handover failure information for the plurality of UE devices and the at least one base station.

13. The non-transitory machine-readable medium of claim 11, wherein the operations further comprise:
determining if a number of devices experiencing a synchronization failure are located near a center of the first cell coverage area of the base station exceeds a threshold; and
responsive to a determination that number of devices experiencing a synchronization failure are located near a center of the cell coverage area of the base station exceeds a threshold, disabling boosting of a transmit power of the synchronization signal block by the base station.

14. The non-transitory machine-readable medium of claim 11, wherein the determining a boosted power level of the transmit power of the synchronization signal block by the one base station to minimize disruption to the UE devices in the overlapping area comprises determining a boosted power level of the transmit power of the synchronous signal block to minimize a downlink/uplink mismatch for UE devices in the overlapping area.

15. The non-transitory machine-readable medium of claim 11, wherein the operations further comprise:
performing a heuristic analysis based on the performance information for the plurality of user equipment (UE) devices and the at least one base station; and
based on the heuristic analysis, determining to temporarily boost the transmit power of the synchronization signal block by the base station to facilitate synchronization between the base station and the UE devices experiencing the synchronization failure.

16. The non-transitory machine-readable medium of claim 15, wherein the performing a heuristic analysis comprises balancing improved performance for UE devices located near a cell edge of a cell served by the base station against a decrease in performance for UE devices in the overlapping area.

17. A method, comprising:
collecting, by a processing system including a processor, performance information for a plurality of user equipment (UE) devices and at least one base station in a radio communication network, wherein the performance information includes at least connection failure information and handover failure information for the plurality of UE devices and the at least one base station;
storing, by the processing system, the performance information at a node of a core network, wherein the core network is in data communication with the radio communication network;
processing, by the processing system, the performance information at the node of a core network;
determining, by the processing system, based on the performance information, that one or more UE devices of the plurality of UE devices experience a synchronization failure attempting to connect to a base station of the at least one base station;
determining, by the processing system, to temporarily boost a transmit power of a synchronization signal block by the base station to facilitate synchronization between the base station and the UE devices experiencing the synchronization failure;
determining, by the processing system, based on the performance information, a number of UE devices of the one or more UE devices are located in an area of a cell edge of a coverage area of the base station;
determining, by the processing system, a boosted power level of the transmit power of the synchronization signal block by the base station, wherein the determining a boosted power level is responsive to a determination that the number of UE devices of the one or more UE devices located in the area of a cell edge exceeds a threshold, wherein the determining a boosted power level of the transmit power of the synchronization signal block by the base station comprises selecting, by the processing system, a transmit power of the synchronization signal block by the one base station to minimize disruption to the UE devices in an overlapping area of cell coverage of the one base station;
initiating transmission, by the processing system, of the synchronization signal block by the base station at the boosted power level for reception by the UE devices experiencing the synchronization failure; and
connecting, by the processing system, one or more of the UE devices to the base station.

18. The method of claim 17, wherein the initiating transmission of the synchronization signal block by the base station comprises:
communicating, by the processing system, a network communication from the node of a core network to the base station.

19. The method of claim 17, wherein the selecting a transmit power of the synchronization signal block comprises:
selecting, by the processing system, a boosted power level of the transmit power of the synchronous signal block to minimize a downlink/uplink mismatch for UE devices in the overlapping area of cell coverage.

20. The method of claim 17 further comprising:
performing a heuristic analysis based on the performance information for the plurality of user equipment (UE) devices and the at least one base station, including balancing improved performance for UE devices located near a cell edge of a cell served by the base station against a decrease in performance for UE devices in the overlapping area; and
based on the heuristic analysis, determining to temporarily boost the transmit power of the synchronization signal block by the base station to facilitate synchronization between the base station and the UE devices experiencing the synchronization failure.

* * * * *